United States Patent Office.

JAMES WILLIAM BLACK, OF BERWICK, NOVA SCOTIA, CANADA.

ICE-CREAM SODA.

SPECIFICATION forming part of Letters Patent No. 332,134, dated December 8, 1885.

Application filed August 3, 1885. Serial No. 173,442. (No specimens.)

*To all whom it may concern:*

Be it known that I, JAMES W. BLACK, of Berwick, in the county of Kings and Province of Nova Scotia, Canada, have invented certain new and useful Improvements in Ice-Cream Soda; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to a new confectionery composition or sirup for conveniently and economically making, as desired, a refreshing beverage called "ice-cream soda." The ingredients used in the beverage, except the ice-water, are combined in a concentrated form and bottled for use, so that as occasion demands it may be quickly mixed with ice-water to form an effervescent, refreshing, and healthful drink.

In forming my cream-sirup I mix the ingredients in about the following proportions: The whites of ten eggs are beaten to a stiff froth, and to this is added and thoroughly mixed therewith nine pounds of granulated or powdered white sugar. Four quarts of cold water are then added, and the mixture stirred till the sugar is dissolved and a uniform mixture obtained. I prefer then to place in a separate vessel five pints of this mixture for separate treatment, as described below. To the remaining larger quantity of the mixture I add six ounces of lime-fruit juice, or other fruit-juice, eight ounces of tartaric acid or its equivalent—such as citric acid—four lemons, and two ounces of any of the well-known flavoring extracts desired. The ingredients are carefully mixed, and the resulting sirup, which may be called the "acidulated cream-sirup," is bottled for use. To the five-pint mixture of beaten white of eggs, sugar, and water, which was separated, as above mentioned, I add eight ounces of bicarbonate of soda and stir well together, and this mixture may be called the "carbonated sirup," and is separately bottled or placed in a jar for subsequent use with the acidulated cream-sirup. The lemons used may be squeezed and the juice only added to the acidulated sirup; or it is evident that the lemons may be sliced or grated and the whole added to the sirup, if desired.

Instead of adding the bicarbonate of soda to the mixture of beaten whites of eggs, sugar, and water, it may be dissolved in water and mixed with plain sirup; or it is evident that a simple solution of bicarbonate of soda could be used in connection with the acidulated cream-sirup for preparing a drink or glass of the ice-cream-soda beverage.

I do not limit myself to the proportions of ingredients above mentioned, as it is evident that the proportions can be varied without departing from my invention.

A glass of ice-cream soda is readily mixed by placing a small ladle of each kind of sirup in a drinking-glass and filling up with ice-water, which produces a beautiful drink, creamy and foaming at the top. The sirups may be drawn through measuring taps or faucets, which can be readily applied to the jars.

The cream-sirup stored in bottles or jars is quite portable, and therefore well adapted to use on excursions, at picnics, &c., doing away with the bother of using carbonic-acid gas and the attendant apparatus.

I intend to use the cream-sirups in connection with an improved fount which I have devised.

Having described my invention, what I claim, and desire to secure by Letters Patent, is—

1. A confectionery composition or sirup for making ice-cream soda, consisting of white of eggs, sugar, water, lime-fruit juice, lemon, and an acid, suitably mixed, as described.

2. The acidulated cream-sirup for making ice-cream soda, composed of beaten white of eggs, sugar, water, lime-fruit or lemon juice, tartaric acid, and a flavoring-extract.

3. The mixture of sirups for making ice-cream soda, consisting, first, of beaten whites of eggs, sugar, water, one or more kinds of fruit-juice, and tartaric acid, forming the acidulated sirup, and, second, a sirup containing bicarbonate of soda, forming the carbonated sirup.

In testimony that I claim the foregoing as my own I hereunto affix my signature in presence of two witnesses.

JAMES WILLIAM BLACK.

Witnesses:
ZEBULON DURLING,
MAGGIE FISHER.